United States Patent
Hansz et al.

(10) Patent No.: US 6,699,303 B2
(45) Date of Patent: Mar. 2, 2004

(54) NON-STICK CERAMO-METALLIC COATING FOR COOKING UTENSILS

(75) Inventors: Bernard Hansz, Nomay (FR); Christophe Malavolta, Herimoncourt (FR); Emmanuel Brugger, Dampierre-les-Bois (FR); Paul Dodane, Exincourt (FR); Christian Coddet, Giromagny (FR)

(73) Assignee: DJA Dodane Jean et Associes DJA Cristel (FR)

( * ) Notice: Subject to any disclaimer, the term of this patent is extended or adjusted under 35 U.S.C. 154(b) by 0 days.

(21) Appl. No.: 10/240,372

(22) PCT Filed: Mar. 21, 2001

(86) PCT No.: PCT/FR01/00849

§ 371 (c)(1), (2), (4) Date: Sep. 27, 2002

(87) PCT Pub. No.: WO01/73164

PCT Pub. Date: Oct. 4, 2001

(65) Prior Publication Data

US 2003/0047029 A1 Mar. 13, 2003

(30) Foreign Application Priority Data

Mar. 28, 2000 (FR) .................................. 00 03909

(51) Int. Cl.[7] .................................. B22F 1/00
(52) U.S. Cl. ......................... 75/252; 427/455
(58) Field of Search .................... 75/252; 427/455

(56) References Cited

U.S. PATENT DOCUMENTS

| | | | | |
|---|---|---|---|---|
| 5,019,454 A | | 5/1991 | Busse | ................... 428/570 |
| 5,447,803 A | * | 9/1995 | Nagaoka et al. | ............ 428/698 |
| 5,733,489 A | | 3/1998 | Hill | .............. 264/125 |
| 5,980,602 A | * | 11/1999 | Carden | ................. 75/236 |
| 6,080,496 A | | 6/2000 | Hupf et al. | ................. 428/626 |
| 6,284,014 B1 | * | 9/2001 | Carden | ................. 75/252 |

FOREIGN PATENT DOCUMENTS

| | | |
|---|---|---|
| DE | 3142312 | 5/1983 |
| EP | 0489914 | 6/1992 |
| EP | 0789007 | 8/1997 |
| FR | 2608592 | 6/1988 |
| FR | 2768158 | 3/1999 |
| JP | 5009028 | 1/1993 |
| WO | WO 9507868 | 3/1995 |
| WO | WO 9626167 | 8/1996 |
| WO | WO 9724469 | 7/1997 |
| WO | WO 9821379 | 5/1998 |
| WO | WO 9828467 | 7/1998 |
| WO | WO 0173164 | 10/2001 |

OTHER PUBLICATIONS

International Application No. PCT/FR01/00849 Search Report dated Jun. 29, 2001.

* cited by examiner

*Primary Examiner*—Ngoclan Mai
(74) *Attorney, Agent, or Firm*—Ostrolenk, Faber, Gerb & Soffen, LLP

(57) ABSTRACT

The invention concerns a non-stick coating (4) for cooking utensils (1) characterized in that it is selected among the group comprising (a) ceramics alone selected among titanium oxynitride, titanium suboxides, titanium subnitrides, spinels, mixed spinels; and (b) ceramo-metallic mixtures wherein the ceramics are selected among titanium oxynitrides, titanium suboxides, titanium subnitrides, spinels, cerium fluoride, silicon carbide, pyrolitic carbon, boron carbide, and the metal is titanium.

13 Claims, 1 Drawing Sheet

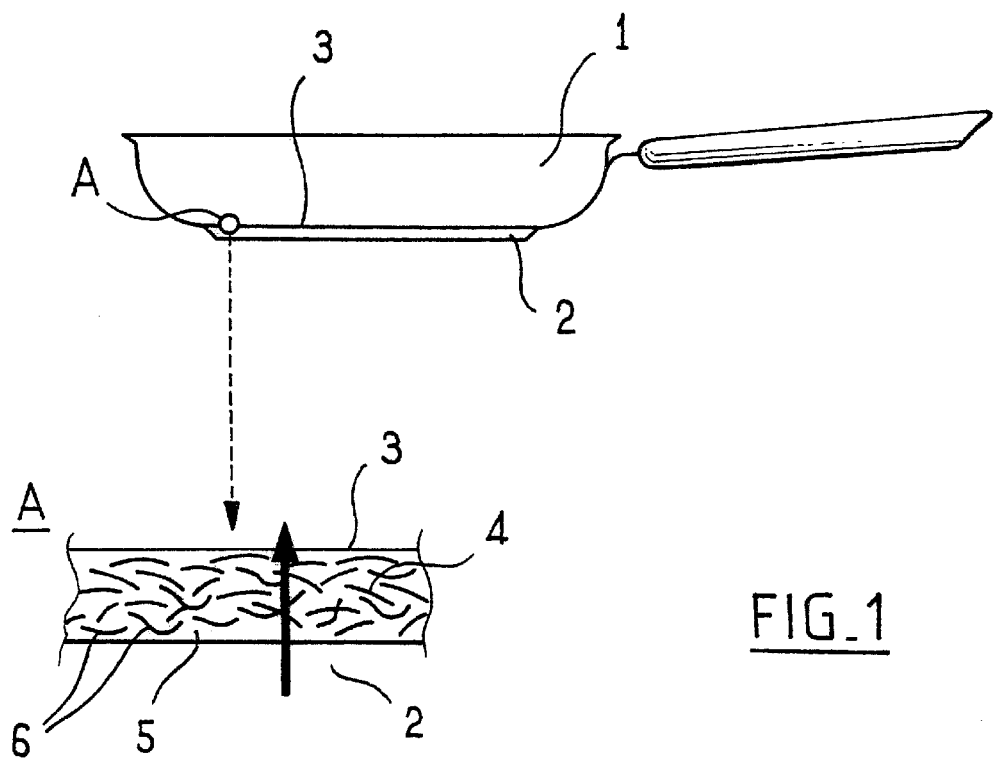
FIG_1
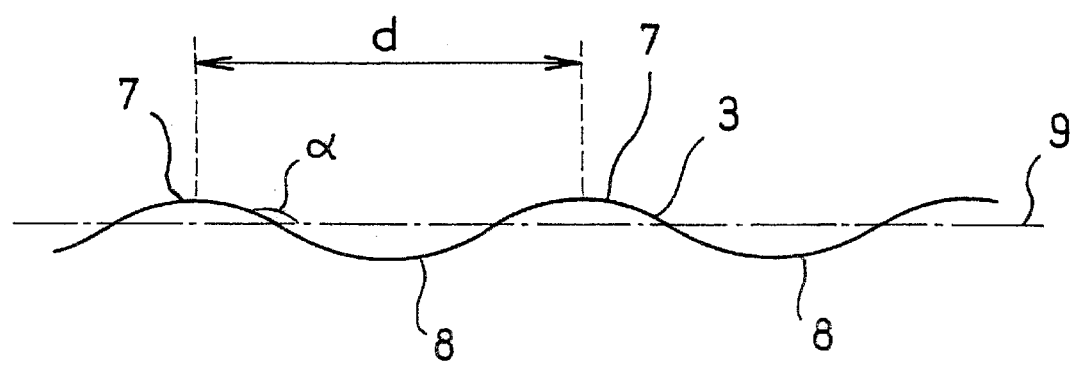
FIG_2

NON-STICK CERAMO-METALLIC COATING FOR COOKING UTENSILS

This application claims priority to PCT/FR01/00849, which was filed Mar. 21, 2001, and French Application Number 00/03909, which was filed Mar. 28, 2000.

The present invention relates to a nonstick coating for cooking utensils, especially utensils made of stainless steel, aluminum, aluminum alloy, cast iron or steel.

BACKGROUND OF THE INVENTION

In this field, polytetrafluoroethylene (PTFE)-based nonstick coatings have been known for a long time. Such coatings are subject to easy scratching, to premature wear and to rapid deterioration in heat. Various means of improving the quality of these coatings, especially their abrasion resistance by the addition of fibers or oxides, and their adherence to the support by suitable anchoring sublayers, have been proposed. For example, document FR 2 768 158 described a complex multilayer coating, the sublayers of which must make the intended improvement possible; but the nonstick layer itself still consists of the upper PTFE layer, which may undergo hot decomposition at the high temperatures to which the cooking utensils, such as frying pans, are subject during cooking.

Coatings based on mixed resins or on silicone resins have also been developed, with the aim of avoiding the use of PTFE, but these techniques have encountered the same limitations.

Nonstick coatings based on quasi-crystals are also known. Unfortunately, quasi-crystals are insulating in the thermal field of cooking, which means that it is difficult to obtain cooking which is satisfactory from the consumers' point of view (impossibility of searing meat, etc.).

Ceramics have already been used for culinary purposes, either in bulk such as glass or ceramic known under various trademarks (Arcopal®, Vision®, etc.) or as a coating (in particular, titanium oxide or nitride, as known from FR 2 608 592 or EP 0 489 914). In the first case, the nonstick qualities were not satisfactory, and in the second case, cracks in the coating were noted, or the coating required a PTFE coating.

BRIEF SUMMARY OF THE INVENTION

The aim of the invention is to provide a new type of nonstick coating for cooking utensils, which does not have these drawbacks, which is hazard-free for the consumer and makes it possible to produce good cooking from a taste point of view.

The aim of the invention is achieved by means of a coating which is directly in contact with food, characterized in that it is chosen from the group comprising ceramo-metallic mixtures in which the ceramics are selected from titanium oxynitrides, titanium suboxides ($TiO_x$ where x is between 1.6 and 1.8), titanium subnitrides ($Ti_xN$ where x is between 1 and 2), spinels or mixed spinels (for example $MgAl_2O_4$, $ZnAl_2O_4$, $MgCr_2O_4$, $MgFe_2O_4$, $CoAl_2O_4$), cerium fluoride, silicon carbide (SiC), pyrolitic carbon or boron carbide ($B_4C$), and the metal is titanium.

Titanium suboxides are known, for example, from documents U.S. Pat. No. 5,733,489, EP 0 739 325 or JP 5 009 028 which describe a method of manufacture. The ceramo-metallic mixtures are known per se and reference may be made to documents EP 0 810 982, WO 9626167, EP 0 789 007, WO 9821379 and particularly WO 9828467 which describe numerous metallo-ceramic compounds and coating methods based on these compounds. However, it is not known from these documents to use these materials to produce a nonstick coating for cooking.

The titanium-based ceramo-metallic mixtures are preferred in the invention since they give rise, possibly during the deposition phase, to titanium oxides or suboxides or nitrides or subnitrides which have the advantage of being hazard-free with regard to food and of being very stable.

Compounds of this type show good wettability, whatever the composition. The Vickers hardness is greater than 900, which guarantees freedom from scratching by cutlery (the Vickers hardness of a knife is about 500).

Preferably, the amount of titanium in the mixture is between 20% and 80%.

The thickness of the spinel phase is about 20 to 80 $\mu$m.

The implementation is preferably done by dry means. A porosity having pores less than 10 $\mu m^2$, and a roughness characterized by undulations forming peaks separated by at least 60 $\mu$m and with slopes of about 120° to 180° with respect to a horizontal midline, are preferred.

In the ceramo-metallic mixture, partition is necessary: the size of the titanium particles is preferably less than 60 $\mu$m and that of the ceramic particles is less than 30 $\mu$m. Preferably, a lenticular structure is sought.

BRIEF DESCRIPTION OF THE DRAWINGS

Other advantages and characteristics will become more clearly apparent on reading the following description of the invention, with reference to the appended drawings in which:

FIG. 1 is a schematic view with an enlarged detail A in section of a culinary utensil incorporating the invention;

FIG. 2 illustrates the surface roughness state of the coating of the invention.

DETAILED DESCRIPTION OF THE INVENTION

FIG. 1 illustrates a pan 1 with a triple base 2 intended to distribute heat over the entire cooking surface and of which the upper surface 3 of the base 2, said surface being in contact with the food to be cooked, consists of a coating layer 4 according to the invention, such as a ceramo-metallic mixture. The metal phase 5 promotes the constant transfer of heat, while the ceramic phase 6 provides the required nonstick and hardness qualities.

FIG. 2 shows schematically a very enlarged section of the surface 3 of the coating layer of the invention. It is formed by peaks 7 separated by troughs 8. The distance d between the peaks is less than 60 $\mu$m and the slopes of the undulations form, with a horizontal midline 9, an angle α of between 120 and 180°.

By way of example, the invention has been successfully applied using a mixture of silicon carbide (SiC) and titanium oxide ($TiO_2$), from the following starting materials: SiC with particle sizes of between 1 and 20 $\mu$m and titanium oxide being an anatase or a rutile with particle sizes of between 1 and 5 $\mu$m. By agglomeration, powder particles ranging from 20 to 120 $\mu$m are obtained. The SiC concentration may vary from 10 to 60%. Spraying this mixture gives a nonstick layer.

What is claimed is:

1. A nonstick coating for cooking utensils comprising ceramo-metallic mixtures, the ceramo-metallic mixtures include a ceramic being a member elected from the group consisting of titanium oxynitrides, titanium suboxides, titanium subnitrides spinels, mixed spinels, cerium fluoride, silicon carbide, pyrolitic carbon, and boron carbide, and a et al, the metal is titanium; wherein the metal is in particles, a size of the metal particles is less than 60 $\mu$m and the ceramic is in particles, a size of the ceramic particles is less than 30 $\mu$m.

2. The coating as claimed in claim 1, wherein the coating has a hardness greater than 900 Vickers.

3. The coating as claimed in claim 1, wherein the coating has pores less than 10 $\mu m^2$.

4. The coating as claimed in claim 1, further comprising a plurality of surface undulations forming peaks separated by at least 60 $\mu$m and with slopes of about 120° to 180° with respect to a horizontal midline.

5. A nonstick coating for cooking utensils comprising ceramo-metallic mixtures, the ceramo-metallic mixtures include a ceramic being a member selected from the group consisting of titanium oxynitrides, titanium suboxides, titanium subnitrides spinels, mixed spinels, cerium fluoride, silicon carbide, pyrolitic carbon, and boron carbide, and a metal, the metal is titanium, wherein an amount of metal in the ceramo-metallic mixture is between 20% and 80% and the metal is in particles, a size of the metal particles is less than 60 $\mu$m and the ceramic is in particles, a size of the ceramic particles is less than 30 $\mu$m.

6. The coating as claimed in claim 5, wherein the coating has hardness greater than 900 Vickers.

7. A nonstick coating for cooking utensils comprising ceramo-metallic mixtures, the ceramo-metallic mixtures include a ceramic being a member selected from the group consisting of titanium oxynitrides, titanium suboxides, titanium subnitrides spinels, mixed spinels, cerium fluoride, silicon carbide, pyrolitic carbon, and boron carbide, and a metal, the metal is titanium, wherein an amount of metal in the ceramo-metallic mixture is between 20% and 80% and the coating has pores less than 10 $\mu m^2$.

8. The coating as claimed in claim 5, wherein the coating has pores less than 10 $\mu m^2$.

9. The coating as claimed in claim 2, wherein the coating has pores less than 10 $\mu m^2$.

10. The coating as claimed in claim 7, further comprising a plurality of surface undulations forming peaks separated by at least 60 $\mu$m and with slopes of about 120° to 180° with respect to a horizontal midline.

11. The coating as claimed in claim 5, further comprising a plurality of surface undulations forming peaks separated by at least 60 $\mu$m and with slopes of about 120° to 180° with respect to a horizontal midline.

12. The coating as claimed in claim 2, further comprising a plurality of surface undulations forming peaks separated by at least 60 $\mu$m and with slopes of about 120° to 180° with respect to a horizontal midline.

13. The coating as claimed in claim 3, further comprising a plurality of surface undulations forming peaks separated by at least 60 $\mu$m and with slopes of about 120° to 180° with respect to a horizontal midline.

* * * * *